June 29, 1971  H. DUPUIS ET AL  3,588,976

CUTTER WITH ADJUSTABLE CLAMPING BLADES

Filed Sept. 18, 1968  3 Sheets-Sheet 1

INVENTORS
HUBERT DUPUIS
LESLIE W. BOWMAN
DAVID A. HOPKINS

BY
ATTORNEYS

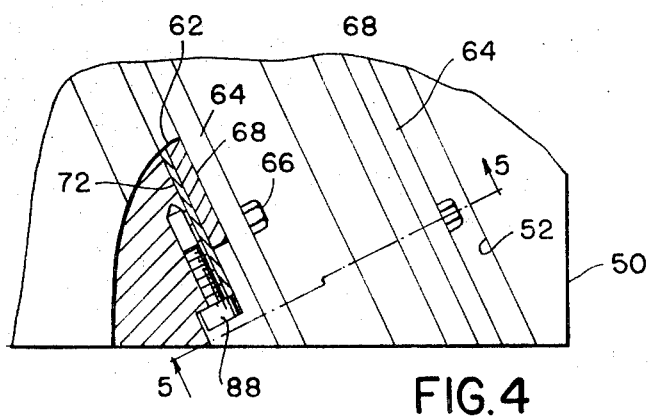
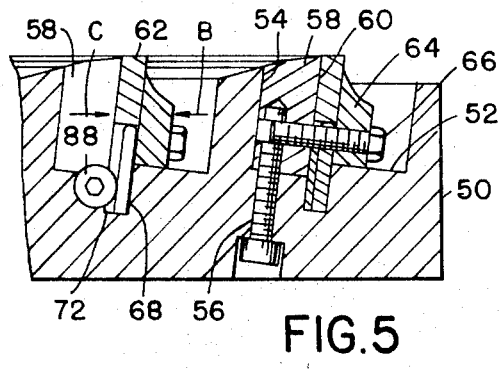
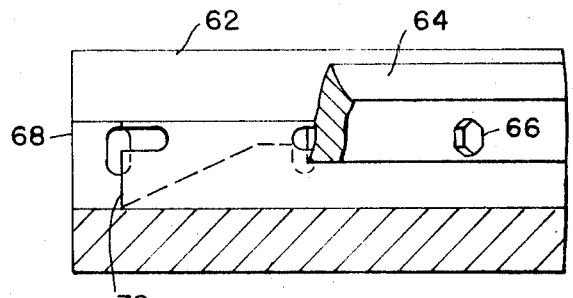
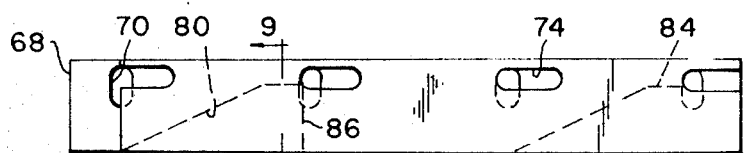
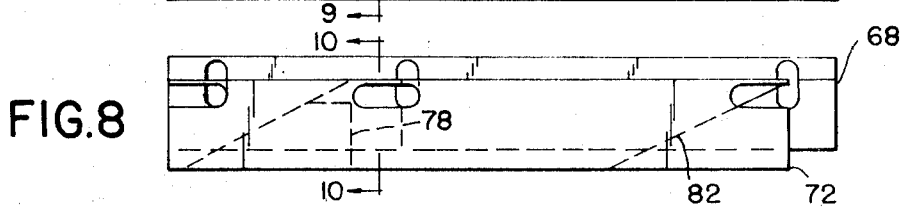
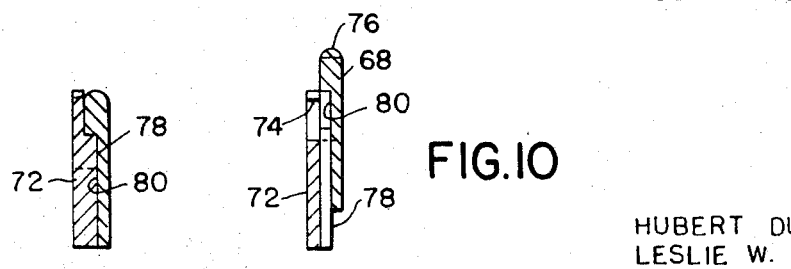

June 29, 1971    H. DUPUIS ET AL    3,588,976
CUTTER WITH ADJUSTABLE CLAMPING BLADES
Filed Sept. 18, 1968    3 Sheets-Sheet 3

INVENTORS
HUBERT DUPUIS
LESLIE W. BOWMAN
DAVID A. HOPKINS

BY *Whittemore, Hulbert & Belknap*
ATTORNEYS

United States Patent Office 3,588,976
Patented June 29, 1971

3,588,976
CUTTER WITH ADJUSTABLE CLAMPING BLADES
Hubert Dupuis, Warren, Leslie W. Bowman, Hazel Park, and David A. Hopkins, Detroit, Mich., assignors to Allegheny Ludlum Steel Corporation, Pittsburgh, Pa.
Filed Sept. 18, 1968, Ser. No. 760,629
Int. Cl. B26d 1/04, 1/12; B23p 15/42
U.S. Cl. 29—95.1                                              10 Claims

ABSTRACT OF THE DISCLOSURE

A cutter body such as a broach having an elongated recess provided with or including a separate member having a flat side against which one side of an elongated flat cutting blade is clamped. The blades are adjusted outwardly of the recess by simultaneously operable camming means spaced longitudinally thereof.

BRIEF SUMMARY OF THE INVENTION

The present invention is applicable to any type of cutting tool either rotary or otherwise, but for simplicity it is illustrated herein as applied to a slab broach. The broach body is provided with elongated recesses adapted to receive correspondingly elongated cutting blades which are required to be adjusted outwardly of the recess as the blades are resharpened in use. In accordance with the present invention, single operating means are provided for effecting equal outward movement of longitudinally spaced points on the blade so that the blade will be adjusted outwardly uniformly from end to end. This means may take the form of a rotary adjustment element having a plurality of eccentric cams thereon. Alternatively it may take the form of a longitudinally movable camming element having inclined camming surfaces engageable with cooperating surfaces provided on the cutting blades.

Means are provided for clamping the blades in adjusted position directly against the flat surface of the recess. During adjustment of course this clamping means is released. However, since the clamping takes place directly against the flat locating surface, and since the clamping forces are applied perpendicularly toward this surface, the accurate adjustment of the cutting blade prior to clamping is not disturbed.

BRIEF DESCRIPTION OF THE DRAWINGS

FIG. 4 is a fragmentary plan view of a broach with a different blade adjusting mechanism.

FIG. 5 is a sectional view on the line 5—5, FIG. 4.

FIG. 6 is a fragmentary sectional view looking generally in the direction of the arrow B, FIG. 5.

FIGS. 7 and 8 are fragmentary elevational views showing the support plate and adjusting plate in different positions.

FIG. 9 is a sectional view on the line 9—9, FIG. 7.

FIG. 10 is a section on the line 10—10, FIG. 8.

DETAILED DESCRIPTION

Figure 1:
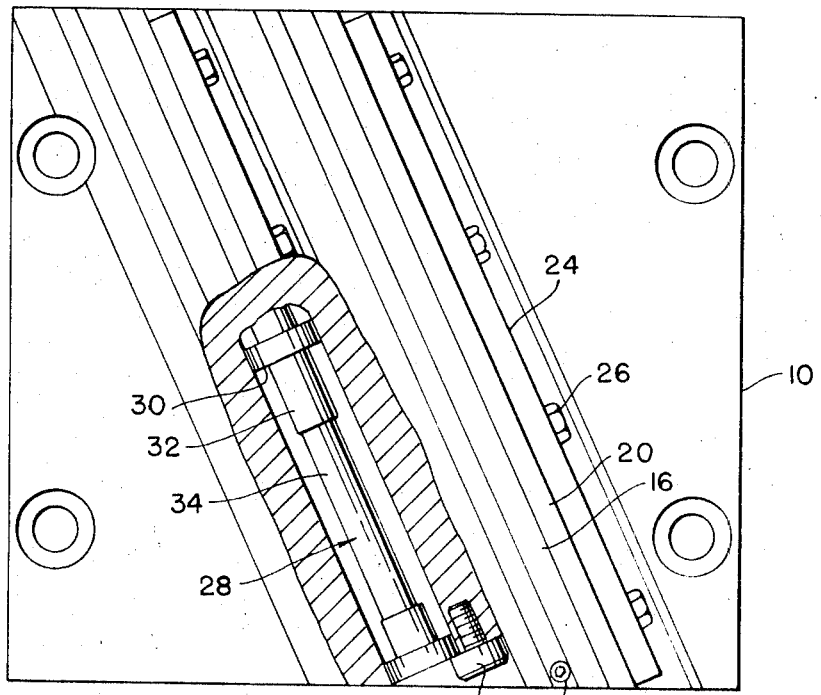
FIG. 1 is a plan view of a slab broach or a portion thereof with parts broken away.
Figure 2:
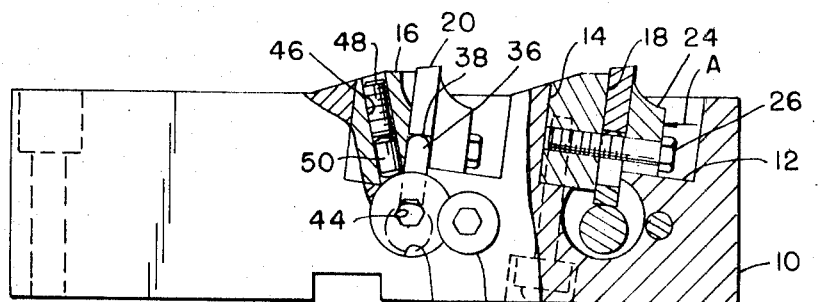
FIG. 2 is an elevational view of the structure shown in FIG. 1, with parts broken away.
Figure 3:
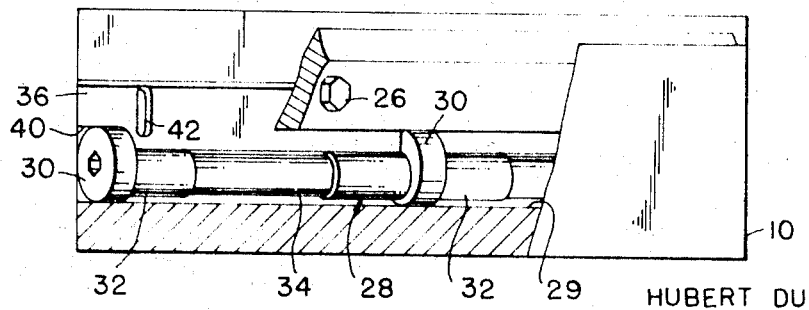
FIG. 3 is a fragmentary elevational view looking in the direction of the arrow A in FIG. 2.

Referring first to FIGS. 1-3 there is shown a tool body 10 which may be a slab broach or a portion thereof provided with a plurality of elongated recesses 12 having flat rear surfaces 14. Secured in these recesses are elongated bars 16 having flat front blade locating surfaces 18 against which cutting blades 20 such for example as blades formed of carbide are supported. The bars 16 are retained in the slots or recesses 12 by suitable clamping means such for example as the screws indicated in dotted lines at 22 in FIG. 2. The carbide blades 20 are located in adjusted position by means subsequently to be described and are clamped in adjusted position by a clamping bar 24, the bar being urged directly toward the locating surface 18 of the bar 16 by a plurality of screws 26. In order to provide for adjustment of the blade 20 outwardly of the groove or recess 12 while maintaining its essential parallelism with the body 10, there is provided an elongated rotary blade adjusting camming member 28 received in a cylindrical bore 29. The member 28 includes circular guide portions 30 which are spaced longitudinally thereof and which support the rotatable camming member 28 for angular adjustment about a longitudinal axis determined by the centers of the circular guide portions 30. Intermediate the guide portions 30 the camming member 28 includes eccentric cam portions 32 separated by slightly reduced portions 34.

Blade lifting and support plates 36 are provided, the upper edge portions of which are rounded as indicated at 38 and are in engagement with the underside of the blades 20. As illustrated in FIG. 2, the blade lifting and support plates 36 are coplanar with the blades, but this condition need not be true since the rounded edge portions 38 of the support plates permits operation with the blades 20 angularly positioned with respect to the blade lifting and support plates.

As best seen in FIG. 3, the blade lifting and support plates are provided with cutout portions 40 to accommodate the circular guide portions 30 and are further provided with vertically elongated slots 42 for the reception of the clamping screws 26 previously described.

Associated with each of the camming members 28 are locating screws 43 the heads of which overlie the ends of the camming members 28 as best seen in FIG. 1. The end of the camming members 28 are provided with non-circular recesses 44 by means of which the camming members may be rotated to effect vertical adjustment of the blades 20. Rotation of the camming members 28 cam longitudinally spaced portions of the blades uniformly so that as the blade is adjusted outwardly of the recess its parallelism with the tool and with other blades is maintained. In order to retain the camming members 28 in adjusted position, the bars 16 are provided with tapped openings 46 which receive setscrews 48 cooperating with friction plugs 50 which clamp the circular guide portions 30 in adjusted position.

Referring now to FIGS. 4-10 there is shown a second embodiment of the present invention. In this case the tool body is indicated at 50 and comprises a plurality of grooves or recesses 52 each of which is provided with a rear wall 54. Mounted against this wall and held in position by screws 56 are elongated bars 58 having flat locating surfaces 60 against which the rear surfaces of cutting blades 62 are clamped. The clamping means comprises a clamping bar 64 which clamps the blades 62 against the surface 60 by means of clamping screws 66.

The means for effecting vertical adjustment of the blades 62 comprises elongated support plates 68 having vertical elongated openings 70 through which the clamping screws 66 extend. Associated with the vertically movable support plates 68 are elongated longitudinally moving adjusting plates 72 provided with longitudinally elongated slots 74 through which the clamping screws 66 extend.

The upper edges of the support plates 68 are rounded as indicated at 76 for the same purpose as described in connection with the support plates 36 of the embodiment first described.

The adjusting plates 72 have camming wedges 78 extending therefrom into correspondingly shaped recesses 80. Specifically, the recesses 80 and wedge projections 78 have inclined camming surfaces 82 and flat top surfaces 84. One of the camming means, including the recess and cam projection, is located at the ends of the support plate and adjustment plate. The other ones, indicated to the left in FIGS. 7 and 8, include the vertical surfaces 86.

When the clamping screws 66 are loosened the adjusting plate 72 may be moved longitudinally as for example to the left in FIG. 7 toward the limiting position shown in FIG. 8. As a result of this movement, the inclined camming surfaces 82 result in uniform vertical movement of the support plate 68, this movement being permitted by the vertically elongated slots 70, and longitudinal movement of the support plate being prevented by the engagement between the sides of these elongated slots and the clamping screws 66.

The means for effecting the longitudinal adjustment of the adjustment plate 72 comprises screws 88 the heads of which engage the opposite ends of the adjustment plate 72. In order to effect adjustment one of the screws 88 is backed off a specific amount and the opposite screw 88 is advanced a corresponding amount, thus effecting an accurately controlled outward adjustment of the blade. It will of course be readily apparent that with a given inclination of the camming surfaces 82 and with a known lead of thread on the adjusting screws 88, rotation of the adjusting screws by uniform increments results in known uniform elevation of the cutting blades relative to the cutter bodies.

Figure 11:
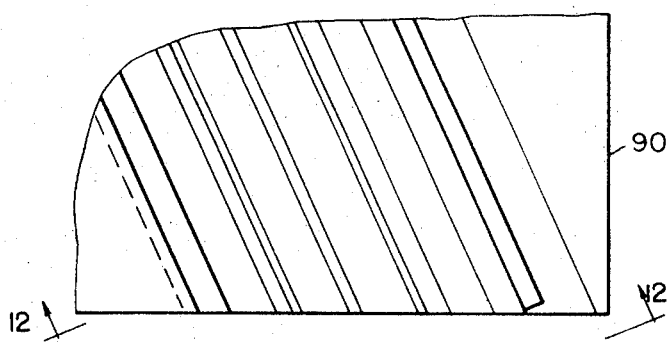
FIG. 11 is a fragmentary plan view illustrating two variations of the mechanism.
Figure 12:
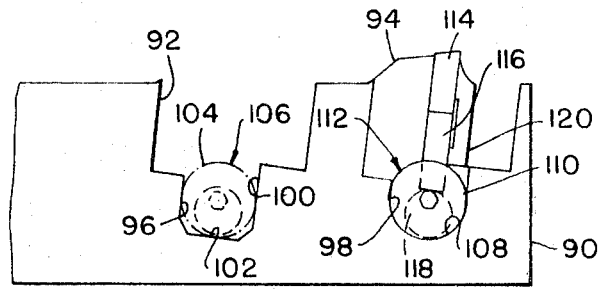
FIG. 12 is an end view looking in the direction of the arrows 12—12, FIG. 11.

Somewhat different embodiments of the invention are illustrated in FIGS. 11 and 12. In these figures the body 90 is provided with the elongated recesses 92 both of which are adapted to receive the elongated bars 94 corresponding to the bars 16 in the embodiment of the invention illustrated in FIGS. 1 and 2. It will be understood that these bars may be supported in the same manner as illustrated in the embodiments of the invention previously described.

In these embodiments of the invention channels 96 or 98 are provided in the cutter body, it being understood that all the channels provided in the body may be of the form illustrated at 96 or may be of the form illustrated at 98. In FIG. 12 the channel is provided with flat side walls 100 and a flat bottom wall 102, the enlarged portions 104 of the rotary adjusting eccentric cam 106 being rotatably supported.

The channel 98 is illustrated as having a semi-cylindrical bottom wall 108 for receiving the enlarged portions 110 of the elongated camming member 112.

The cutting blade 114 is illustrated as supported by the elongated supporting member 116 which engages the eccentric portion 118 of the camming member 112. It will be understood that identical structures is provided in association with the elongated camming member 106. The cutting blade 114 is clamped in position by a clamping bar 120 which operates in the same manner as the clamping bar 24 best illustrated in FIG. 2.

Again, an important advantage of this embodiment of the invention, as well as of the other embodiments, is that the clamping forces are applied directly to the cutting blades in a direction perpendicular to the support and locating surfaces so that there is no tendency for the clamping operation to disturb the precise setting of the blade accomplished by adjustment of the adjusting plate 72.

The drawings and the foregoing specification constitute a description of the improved cutter with adjustable clamping blades in such full, clear, concise and exact terms as to enable any person skilled in the art to practice the invention, the scope of which is indicated by the appended claims.

What we claim as our invention is:

1. A cutting tool comprising a cutter body having an elongated recess extending into one surface thereof provided with a flat locating surface at one side thereof, an elongated adjustable support plate in said recess abutting said flat surface and movable against said surface depthwise of said recess, said plate having openings therethrough elongated transversely of said plate, a clamping bar in said recess, clamping screws extending through said bar and openings into threaded openings at said surface, said bar extending outwardly of said recess beyond the outer edge of said plate to overlie the inner portions of an elongated imperforate generally rectangular cutting insert having a cutting edge located outwardly of said recess, cam means in said recess comprising an elongated camming member having longitudinally spaced camming portions engageable with correspondingly longitudinally spaced portions of said plate, and means for moving said camming member to effect equal camming actions by said camming portions to adjust said plate uniformly depthwise of said recess.

2. A tool as defined in claim 1 in which said flat locating surface constituting one side of the elongated recess is provided by one side of an elongated removable locating bar removably received in said recess.

3. A tool as defined in claim 1 in which said cam means comprises an elongated rotary member, means supporting the member for rotation about its axis, said camming portions comprising longitudinally spaced eccentric cam portions engageable with the lower edge of said support plate.

4. A tool as defined in claim 3 in which said elongated rotary camming member is received in a cylindrical recess, said rotary member having longitudinally spaced circular guide portions received in said bore.

5. A tool as defined in claim 4 comprising selectively operable friction means engageable with said rotary camming member to lock it in adjusted position.

6. A tool as defined in claim 1 in which said cam means comprises an elongated camming plate movable longitudinally in juxtaposition to said support plate and having spaced inclined camming portions operable upon longitudinal movement of said camming plate to effect transverse movement of said support plate outwardly of said recess.

7. A tool as defined in claim 6 in which said plates are in side by side contact, and said camming and follower surfaces are formed on projections extending laterally from one of said plates into recesses formed in the other plate.

8. A tool as defined in claim 1 comprising means for effecting longitudinal adjustment of said adjusting plate, said means comprising headed screws carried by said tool body, the heads of the screws overlying the ends of said adjusting plate, adjustment of the plate being accomplished by backing off the screw at one end thereof and advancing the screw at the other end thereof by equal amounts, whereby predetermined equal outward movement of opposite ends of the cutting blade are obtained.

9. A tool as defined in claim 1 in which the edge of said support plate engaging the inner edge of said cutter blade is transversely rounded.

10. A tool as defined in claim 5 in which said friction means comprises a screw received in a threaded passage intersecting said channel in alignment with one of said circular guide portions.

References Cited

UNITED STATES PATENTS 2,660,242  11/1953  Lane _____ 144—230X
2,751,006   6/1956  Lane _____  29—105X

FOREIGN PATENTS 568,974   4/1945  Great Britain.
817,654  10/1951  Germany.

HARRISON L. HINSON, Primary Examiner

U.S. Cl. X.R.

29—105; 144—218